Figure 1:
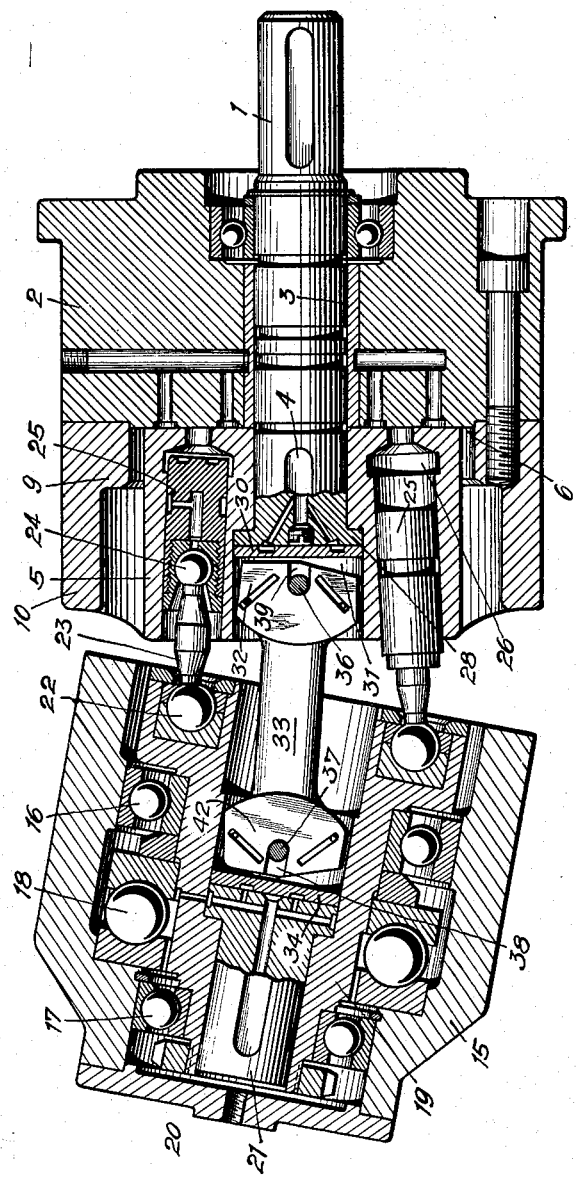

Feb. 7, 1956 F. KLOPP 2,733,665
HYDRAULIC TRANSMISSION WITH INWARDLY AND
OUTWARDLY MOVING AND ROTATING PISTONS
Filed Sept. 5, 1951 2 Sheets-Sheet 1

INVENTOR
FRIEDRICH KLOPP
BY
ATTORNEY.

ly with the intersection of the longitudinal axis
of the inclined coupling shaft with the longitudinal axes
of the cylinder and piston assembly and of the wobbler

United States Patent Office 2,733,665
Patented Feb. 7, 1956

2,733,665

HYDRAULIC TRANSMISSION WITH INWARDLY AND OUTWARDLY MOVING AND ROTATING PISTONS

Friedrich Klopp, Solingen-Wald, Germany

Application September 5, 1951, Serial No. 245,222

Claims priority, application Germany September 9, 1950

2 Claims. (Cl. 103—162)

This invention relates to fluid power transmissions such as pumps or prime movers of the wobbler-plate type in which the inclination of a rotated wobbler plate or like member produces a reciprocatory piston motion and more particularly to hydraulic wobbler-type transmissions in which a rotatable cylinder and piston assembly is actuated by a rotary wobbler plate or like member through the medium of a coupling shaft inter-connected between the cylinder and piston assembly and the wobbler member and incorporating a coupling connection at opposite ends of the coupling shaft, forming a double coupling connection. The transmission may be constructed to operate as a pump or as a power transmission. When adapted to operate as a pump the cylinder and piston assembly will be connected to be rotated from some suitable external power source, such as an electric motor. When adapted to operate as a power transmission, a pair of the transmissions may be connected in series, with the one functioning as a pump to drive the other transmission, which would incorporate a final output shaft from which the power could be taken in any suitable and conventional manner.

In connection with this coupling connection it is necessary that the coupling connections should be robust and be able to withstand the various forces imposed thereon to the practical exclusion of jerkiness of action, shaking, vibration and noise.

It is an object of the invention to provide a wobbler-type fluid power transmission with an improved construction of coupling connection which posseses the required robustness and is able to accommodate and transmit the forces imposed thereon in a highly efficient and economical manner.

It is also an object of the invention to provide a coupling in which the coupling connections are effected through mutually engaged flattened driving or force transmitting surfaces which can be provided upon relatively large and, hence, robust masses and can be manufactured in a simple and inexpensive manner.

In particular, a coupling connection in accordance with this invention comprises a coupling shaft having an end portion connected to impart rotation to the wobbler part of the transmission through the medium of mutually engaged flattened driving or transmitting surfaces and held axially located by a stop pin extending perpendicularly with respect to the longitudinal axis of the coupling shaft and located at a point substantially coincident with the intersection of the coupling shaft with the central longitudinal axis of the inclined wobbler part. Specifically, a coupling connection is provided comprising a coupling shaft having opposite end portions with flattened driving surfaces connected with a shaft carrying a rotatable cylinder and piston assembly and the wobbler part of the transmission through the medium of pin connections which are located at points coinciding substantially with the intersection of the longitudinal axis of the inclined coupling shaft with the longitudinal axes of the cylinder and piston assembly and of the wobbler member, these pin connections being formed to hold the coupling shaft against axial displacement relatively to the cylinder and piston assembly and the wobbler member.

Figure 2:
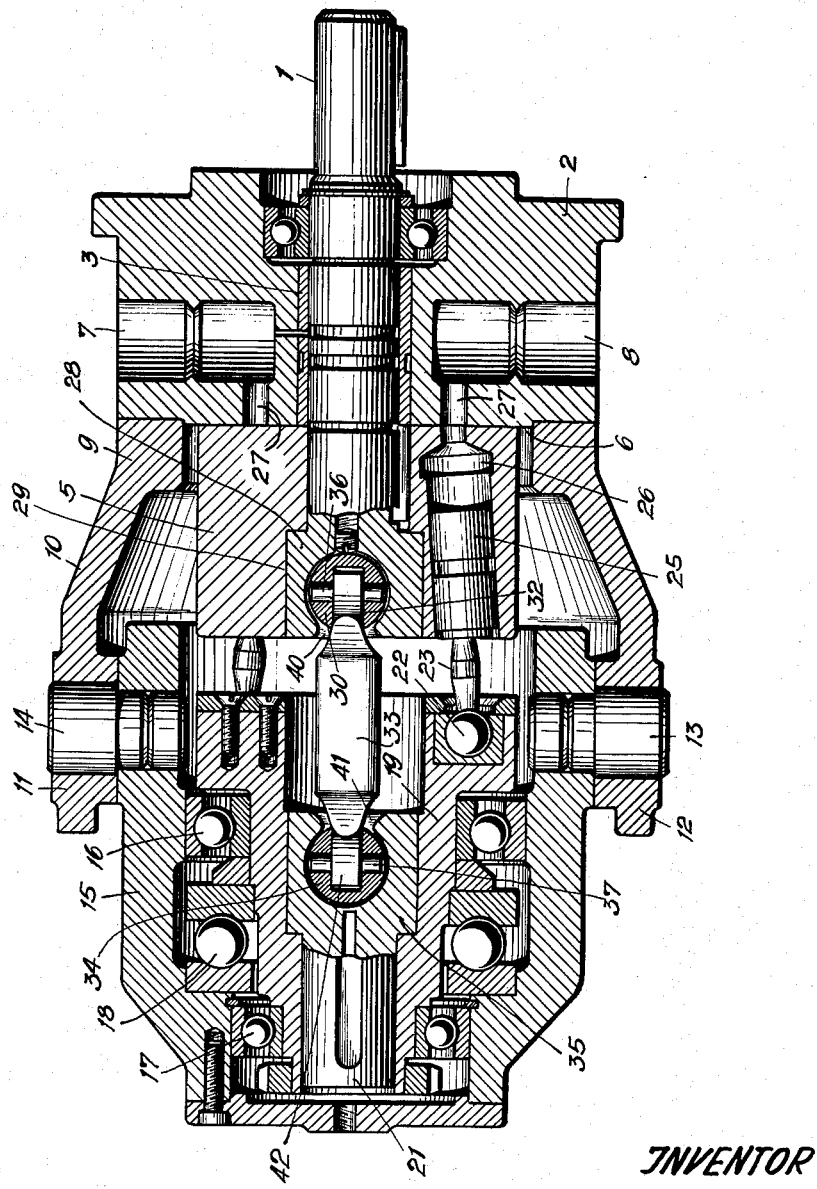

The above and further objects and advantages and features of this invention, residing in the construction, arrangement and combination of parts will appear clear from consideration of the following detail description and appended claims with reference to the accompanying drawings, in which:

Fig. 1 is a vertical section through a transmission constructed according to the invention, and Fig. 2 is a section of this transmission taken in a plane perpendicular to the plane of the section of Fig. 1.

The invention can be applied to a pump or a prime mover, whereby the construction of the pump would differ in no essential aspect from that of the prime mover. Furthermore, it is possible to combine a pump constructed according to the invention with a prime mover constructed according to the invention to form a hydraulic transmission.

In the drawings, 1 indicates a shaft, which may be driven by an electric motor (not shown) and is rotatably journalled in a journal-housing 2 by means of a bearing bushing 3. A cylinder block 5 is secured to the shaft 1 and is urged by the prevailing fluid pressure or control against a pressure surface 6 defined in the inner end face of the journal-housing 2. A fluid suction-channel system 7 and a fluid pressure-channel system 8 are provided in the journal-housing 2.

A pedestal-bearing 10 is secured upon the journal-housing 2 through the medium of an annular flange 9 held engaged and centered with respect to the pressure surface 6 by screw bolt or like means as seen in Fig. 1.

The part 10 has diametral bearing portions 11 and 12 with respect to which a frame part 15 is swingably journalled upon this part 10 by means of bearing pins 13 and 14.

The frame part 15 carries the wobbler member 19, shown in this instance, in the form of a cylindrical member rotatably mounted within the part 15 through the medium of roller bearings 16, 17 and an end thrust bearing 18, this wobbler member (the angularity of which can be varied by swinging adjustment of the frame part 15 about the bearings 11, 14 and 12, 13) being rigidly connected with a stub-shaft 21.

The wobbler member 19 has piston rods 23 pivotally journalled thereon in known manner by means of ball and socket joints 22, which piston rods 23 pivotally engage pistons 25 by means of further ball and socket joints 24, the pistons 25 being arranged for reciprocation within cylinders 26 in the cylinder-block 5. The cylinders 26 have communication with channels 27 connected with the suction and pressure systems 7 and 8.

The end of the shaft 1 is enlarged at 28 and has its thus reinforced end 28 located in a corresponding cavity 29 in the cylinder block 5. This shaft end 28 has a drilled bore which receives a plunger pin 30, acting as a rotation transmitting member. This pin 30 is held in position in the cylinder block 5 merely by the engagement of the enlarged shaft end portion 28 within the cavity 29. As to be seen from Fig. 1, the plunger pin 30 is provided with a central slot 31 in which a flat driver head 32 on a coupling shaft 33 engages. In corresponding manner, on the other side of the coupling shaft 33, a flat driver head 42 engages in a slot in the plunger pin 34, which is mounted in a drilled bore in the enlarged end 35 of the stub shaft 21. The two driver heads 32 and 42 lie in the same plane which extends along the axes of the shaft 1 and the stub shaft 21 and which plane is vertical to the section plane of Fig. 2. Transverse to the longitudinal axis of the coupling shaft 33 there is a stop-pin 36 which is secured in the plunger pin 30 at a point where the longitudinal axis of the coupling-shaft 33 intersects the longitudinal axis of the driving shaft 1. The flat driver head 32 has an axially extending slot 39 which engages over the stop-pin 36. In corresponding manner, a stop-pin 37 is secured in the plunger pin 34 at a point where the longitudinal axis of the coupling shaft 33 intersects the longitudinal axis of the stub-shaft 21 and thus the longitudinal axis of the wobbler member 19. The stop-pin 37 engages an axially extending slot 38 in the driver head 42, such that the mutually facing surfaces of both pins 36 and 37 lie against the corresponding closed inner ends of the slots 38 and 39. In this way axial displacement of the coupling-shaft is prevented.

The reinforcements 28 and 35 of the shafts 1 and 21 are provided on their mutually opposite surfaces with cavities 40, 41 in order to permit engagement of the flat driver heads 32 and 42 at the ends of the coupling shaft 33 in the slots of the plunger pistons 30, 34.

In operation, with the device connected to function as a pump, it is assumed that the cylinders 26 and passages 7, 8 and 27 are filled with liquid, the passage 7 being connected as inlet for the liquid and the passage 8 being connected as outlet, and the shaft 1 being connected to be driven by an external power source, such as an electric motor. Rotation of the shaft 1 will produce rotation of the cylinder and piston assembly 26, 25, which rotation is transmitted by the coupling shaft 33 to the shaft 21 and, hence, to the wobbler member 19, the inclination of which can be adjusted, by swinging the casing structure 15 about the bearing pins 13 and 14 in the manner well known in the art, so as to vary the extent of reciprocation of the pistons 25 as the cylinder 26 it rotated.

In adapting the invention for operation as a power transmission, a pair of the devices, as disclosed in the drawings, could be connected in series, with the one device operating as a pump, as just described, and the other device being connected to receive the liquid from the pump so that its piston and cylinder assembly is actuated by the pump.

I claim:

1. In a wobbler-type fluid power device, the combination of a stationary housing having a hollow interior, said housing containing passages for the flow of the operating fluid, a rotatable drive shaft, means mounting said shaft for rotation upon said housing with an end portion of said shaft extending into said hollow interior and having a first diametral bore therethrough, a cylinder block detachably mounted upon said extended shaft portion for rotation therewith, said cylinder block having a plurality of cylinder bores in circular spaced assembly opening through one end of said block and including pistons reciprocable in said cylinder bores, said cylinder block also having a first central cavity in axial alignment with said shaft, said cylinder bores encircling said cavity, said extended shaft portion being disposed in said cavity, the peripheral side walls of said cavity closing the ends of said first diametral bore and having a close fit with said extended shaft portion, a wobbler frame, means mounting said wobbler frame for adjustable tilting motion relative to said housing, said wobbler frame carrying rotatable structure including a detachable axially disposed insert having a second diametral bore therethrough, said rotatable structure having a second central cavity opening toward said cylinder block, said insert being disposed in said second cavity, the peripheral side walls of said second cavity closing the ends of said second diametral bore and having a close fit with said insert, two plunger members, one of said plunger members being detachably mounted in each of said first and second diametral bores and being substantially longitudinally coextensive therewith, each said plunger member having a slot defining rotation drive surfaces, Cardan joint links interconnecting said pistons and said rotatable structure, and a main torque transmitting shaft having flattened end portions engaging with said drive surfaces within each said plunger member slot.

2. In a wobbler-type fluid power device, the combination of a stationary housing having a hollow interior, said housing containing passages for the flow of the operating fluid, a rotatable drive shaft, means mounting said shaft for rotation upon said housing with an end portion of said shaft extending into said hollow interior and having a first diametral bore therethrough, a cylinder block detachably mounted upon said extended shaft portion for rotation therewith, said cylinder block having a plurality of cylinder bores in circular spaced assembly opening through one end of said block and including pistons reciprocable in said cylinder bores, said cylinder block also having a first central cavity in axial alignment with said shaft, said cylinder bores encircling said cavity, said extended shaft portion being disposed in said cavity, the peripheral side walls of said cavity closing the ends of said first diametral bore and having a close fit with said extended shaft portion, a wobbler frame, means mounting said wobbler frame for adjustable tilting motion relative to said housing, said wobbler frame carrying rotatable structure including a detachable axially disposed insert having a second diametral bore therethrough, said rotatable structure having a second central cavity opening toward said cylinder block, said insert being disposed in said second cavity, the peripheral side walls of said second cavity closing the ends of said second diametral bore and having a close fit with said insert, two plunger members, one of said plunger members being detachably mounted in each of said first and second diametral bores and being substantially longitudinally coextensive therewith, each said plunger member having a slot defining rotation drive surfaces and a diametral pin perpendicular to the longitudinal axis of said plunger member and extending across said slot and disposed entirely within the contour of each said plunger member, Cardan joint links interconnecting said pistons and said rotatable structure, and a main torque transmitting shaft having flattened end portions engaging with said drive surfaces, each said end portion having an axial slot engaged over said pin within each said plunger member slot.

References Cited in the file of this patent
UNITED STATES PATENTS

| | | |
|---|---|---|
| 1,115,433 | Hunt | Oct. 27, 1914 |
| 1,300,733 | Keller | Apr. 15, 1919 |
| 1,931,969 | Thoma | Oct. 24, 1933 |
| 2,298,850 | Vickers | Oct. 13, 1942 |
| 2,405,600 | Morris | Aug. 13, 1946 |
| 2,408,574 | Morris | Oct. 1, 1946 |
| 2,525,979 | Vickers | Oct. 17, 1950 |
| 2,553,655 | Herman et al. | May 22, 1951 |
| 2,696,189 | Born et al. | Dec. 7, 1954 |
| 2,699,123 | Bonnette et al. | Jan. 11, 1955 |